United States Patent [19]

Laurent et al.

[11] Patent Number: 4,610,882

[45] Date of Patent: * Sep. 9, 1986

[54] ZEOLITE IN POULTRY FEED UTILIZATION

[75] Inventors: Sebastian M. Laurent, Greenwell Springs; Robert N. Sanders, Baton Rouge, both of La.

[73] Assignee: Ethyl Corporation, Richmond, Va.

[*] Notice: The portion of the term of this patent subsequent to Dec. 3, 2002 has been disclaimed.

[21] Appl. No.: 757,160

[22] Filed: Jul. 22, 1985

Related U.S. Application Data

[63] Continuation-in-part of Ser. No. 475,370, Mar. 14, 1983, Pat. No. 4,556,564.

[51] Int. Cl.$^4$ .................... A01N 59/06; A23K 1/24

[52] U.S. Cl. .................... 424/154; 426/2; 426/72; 426/74

[58] Field of Search .................. 426/2, 72, 74, 807; 423/328, 329; 424/154; 208/2

[56] References Cited

U.S. PATENT DOCUMENTS 4,556,564 12/1985 Laurent et al. .................... 426/2

Primary Examiner—Raymond N. Jones
Assistant Examiner—Elizabeth A. King
Attorney, Agent, or Firm—Donald L. Johnson; John F. Sieberth; Paul H. Leonard

[57] ABSTRACT

A method of improving the feed utilization efficiency of poultry by adding a small effective amount of zeolite A up to about four weight percent of the feed, to the feed of the poultry, and feeding the poultry the feed containing the zeolite A.

20 Claims, No Drawings

ZEOLITE IN POULTRY FEED UTILIZATION

CROSS-REFERENCE TO RELATED APPLICATION

This Application is a Continuation-In-Part of application Ser. No. 475,370 filed on Mar. 14, 1983, now U.S. Pat. No. 4,556,564.

BACKGROUND OF THE INVENTION

The present invention is in the general field of poultry farming and relates to the feeding of poultry and particularly to improving feed utilization efficiency of the poultry.

The demand for poultry has expanded considerably over the last decade. The poultry industry has grown from a home industry to a large scale manufacturing industry in which tens of thousands of chickens, turkeys and other birds are fed daily at single farms or poultry installations. Some poultry are produced for eating, some for eggs and some are produced for hatching.

With the cost of feed continually increasing, it is important that feed efficiency of the poultry be improved.

It is therefore an important object of the present invention to provide a means for increasing or improving the feed utilization of poultry without increasing production costs and without having any deleterious effect on the food value or quality of the poultry or poultry products.

An article by C. Y. Chung et al from Nongsa Sihom Youngu Pogo 1978, 20 (Livestock) pp. 77–83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976—Suweon, Korea) showed that no significant difference was observed when 1.5, 3, and 4.5 percent zeolite was added to chicken layer diets.

U.S. Pat. No. 3,836,676 issued to Chukei Komakine in 1974 discloses the use of zeolites as an absorbent for adhesion moisture of ferrous sulfate crystals in an odorless chicken feed comprising such crystals and chicken droppings. The results were said to be no less than those in the case where chickens were raised with ordinary feed.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5:536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. The foregoing Japanese experiments were reported by F. A. Mumpton and P. H. Fishman in the *Journal of Animal Science*, Vol. 45, No. 5 (1977) pp. 1188–1203.

Canadian Pat. No. 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

In a recent study at the University of Georgia, both broilers and layers were fed small amounts (about 2%) of clinoptilolite, a naturally occurring zeolite from Tilden, Texas. An article written by Larry Vest and John Shutze entitled "The Influence of Feeding Zeolites to Poultry Under Field Conditions" summarizing the studies was presented at Zeo-Agriculture '82.

A study by H. S. Nakave of feeding White Leghorn layers clinoptilolite, reported in 1981 Poultry Science 60:944–949, disclosed no significant differences in egg shell strength between hens receiving the natural zeolite and hens not receiving the natural zeolite.

In general zeolites are crystalline, hydrated aluminosiicates of alkali and alkaline earth cations, having infinite, three-dimensional structures. There are a wide variety of types. Some types are naturally occurring and some of these types are made synthetically. Other types are made ony synthetically.

Zeolites consist basically of a three-dimensional framework of $SiO_4$ and $AlO_4$ tetrahedra. The tetrahedra are crosslinked by the sharing of oxygen atoms so that the ratio of oxygen atoms to the total of the aluminum and silicon atoms is equal to two or $O(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A which is not found in nature and is made synthetically may be distinguished from other zeolites and silicates on the basis of composition, X-ray powder diffraction patterns, and certain physical characteristics. The X-ray patterns for these zeolites are described below. Composition and density are among the characteristics which have been found to be important in identifying these zeolites.

The basic formula for all crystalline sodium zeolites may be represented as follows:

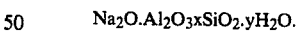
$$Na_2O.Al_2O_3xSiO_2.yH_2O.$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85+0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$1.0\pm0.2Na_2O.Al_2O_3.1.85\pm0.5SiO_2.yH_2O$

In the formula, "y" may be any value up to 6.

An ideal zeolite A has the following formula: $(NaAlSiO_4)_{12}.27H_2O$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the $K\alpha$ doublet of copper and a Geiger counter spectrometer with a strip chart pen recorder is used. The peak heights, I, and the positions as a function of $2\theta$ where $\theta$ is the Bragg angle, are read from a spectrometer chart. From these, the relative intensities, $100\ I/I_o$, where $I_o$ is the intensity of the strongest line or peak and d the interplanar spacing in angstroms corresponding to the recorded lines are calculated.

X-ray powder diffraction data for a sodium zeolite A are given in Table I.

TABLE I
X-RAY DIFFRACTION PATTERN FOR ZEOLITE A

| $h^2 + k^2 + l^2$ | d (Å) | $\dfrac{100\ I}{I_o}$ |
| --- | --- | --- |
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | 1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The most significant d values for zeolite A are given in Table II.

TABLE II
MOST SIGNIFICANT d VALUES FOR ZEOLITE A

| d Value of Reflection in Å | | |
| --- | --- | --- |
| 12.2 | ± | 0.2 |
| 8.7 | ± | 0.2 |
| 7.10 | ± | 0.15 |
| 5.50 | ± | 0.10 |
| 4.10 | ± | 0.10 |
| 3.70 | ± | 0.07 |
| 3.40 | ± | 0.06 |
| 3.29 | ± | 0.05 |
| 2.98 | ± | 0.05 |
| 2.62 | ± | 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a sight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si=\frac{2}{3}=0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminium-silicate water mixture having an $SiO_2$: $Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

It is an important object of the present invention to provide an improved feed formulation for poultry which contains a small amount of zeolite A.

It is a principal object of the invention to provide a poultry feed containing zeolite A which improves the feed utilization efficiency of the poultry without causing a deleterious effect on the poultry.

Another object of the invention is to provide an improved process for increasing the weight of eggs from laying poultry wherein an effective amount of zeolite A is added to the diet of the poultry, when poultry diets are deficient in calcium.

Still another object of the invention is to cost effectively increase poultry production.

Other objects and advantages of the invention will be more fully understood from a reading of the description and claims hereinafter.

SUMMARY OF THE INVENTION

The present invention relates to a method of improving the feed utilization efficiency of poultry without deleterious effects on the poultry or poultry products wherein a small amount of zeolite A up to about four weight percent of feed is added to the feed of the poultry and the feed containing the zeolite A is regularly fed to the poultry.

DESCRIPTION OF THE PREFERRED EMBODIMENT

It has been discovered that the addition of a relatively small amount of zeolite A to a regular or standard feed for poultry, expecially laying chickens or hens, effectively improves the feed utilization efficiency of the poultry with no significant changes in feed consumption. Zeolite A is preferably added in amounts of from about 0.25 percent to about 4.00 percent, and more preferably less than about 3.5 percent by weight of the total feed.

A typical feed preparation for large scale poultry operations comprises the following by weight percent:

| | |
|---|---|
| Corn | 62–68 |
| Soy Bean Meal | 18–24 |
| Limestone | 5–9 |
| Alfalfa Meal | 1 |
| Phosphates | 2 |
| Sand | 1–2 |
| Vitamins, Amino Acids Salt and Other Minerals | 0–1 |

Zeolite A is added to such feed formulation in small amounts by weight percent of up to about four with less than 3.5 weight percent being preferred. Greater amounts may be used, but may deprive the poultry of the desired amount of nutrients. Greater amounts are also likely to be cost ineffective. A more preferred amount of zeolite A is from about one-half to about two percent by weight of the total feed formulation. A most preferred amount of zeolite A is about 0.75 to about 1.50 weight percent of the total feed formulation.

The most convenient means of measuring egg shell strength is by measuring the specific gravity of the egg. This is simply done by immersing the egg in solutions of salt water of varying strengths. It is well known in the art that specific gravity correlates with egg shell strength. As specific gravity of the egg is raised, the strength of the egg shell is increased.

Using Ethyl EZA ® zeolite, a commercially available sodium zeolite A, a number of tests were conducted to determine the effect of zeolites on poultry and poultry egg shell quality.

EXAMPLE I

Procedure: 480 hens (Dekalb XL pullets) were divided into eight equal groups of 60 hens each and fed one of the following dietary treatments for a minimum of six weeks:

| Diet | Calcium (Wt. %) | Zeolite A (Wt. %) |
|---|---|---|
| 1 | 4.00 | 0 |
| 2 | 4.00 | 0.75 |
| 3 | 4.00 | 1.50 |
| 4 | 4.00 | 0.68* |
| 5 | 2.75 | 0 |
| 6 | 2.75 | 0.75 |
| 7 | 2.75 | 1.50 |
| 8 | 2.75 | 0.75** |

*diet not adjusted for calcium
**zeolite added on top except diet not adjusted for Cl The diet fed to hens consisted principally of corn supplemented with a soybean meal (SBM) and limestone. Smaller amounts of alfalfa meal, dicalcium phosphate (DiCalP), a synthetic amino acid (DL-methionine), salt, a commercial vitamin and mineral supplement for layers (Micro-Mix). Sand and/or hydrochloric acid (HCl) were added to some diets. Each diet assured that the hens received all of the required nutrients and minerals.

Diets 1–4 contained 1,238 calories per pound, 16% protein, 0.55% total sulfur amino acids, 4% calcium and 0.70% total phosphorous.

Diets 5–8 contained 1,292 calories per pound, 16% protein, 0.55% total sulfur amino acids, 2.75% calcium and 0.70% phosphorous.

All diets were isocaloric and isonitrogenous within treatments and are detailed in Table A.

TABLE A

Experimental Diets for Zeolite Study (Weight Percent)

| | Diet No. | | | | | | | |
|---|---|---|---|---|---|---|---|---|
| | 1 | 2 | 3 | 4 | 5 | 6 | 7 | 8 |
| | | 400.% calcium | | | | 2.75% calcium | | |
| Ingredient | 0.0 | 0.75 | 1.50 | .68 (special) | 0.0 | 0.75 | 1.50 | 0.75 |
| Corn | 63.80 | 63.80 | 63.80 | 63.80 | 63.80 | 67.83 | 67.83 | 67.83 |
| SBM | 21.41 | 21.41 | 21.41 | 21.41 | 20.69 | 20.69 | 20.69 | 20.69 |
| Alfalfa meal | 1.00 | 1.00 | 1.00 | 1.00 | 1.00 | 1.00 | 1.00 | 1.00 |
| Dicalcium Phosphate | 2.07 | 2.07 | 2.07 | 2.07 | 2.03 | 2.03 | 2.03 | 2.03 |
| Limestone | 9.14 | 9.14 | 9.14 | 9.14 | 5.87 | 5.87 | 5.87 | 5.87 |
| DL-methionine | 0.01 | 0.01 | 0.01 | 0.01 | — | — | — | — |
| Salt | 0.35 | 0.10 | — | 0.35 | 0.35 | 0.10 | — | 0.10 |
| Micro-mix | 0.50 | 0.50 | 0.50 | 0.50 | 0.50 | 0.50 | 0.50 | 0.50 |
| Sand | 1.72 | 0.82 | — | 1.04 | 1.72 | 0.82 | — | 1.23 |
| Zeolite A | — | 0.75** | 1.50** | 0.68* | — | 0.75** | 1.50** | 0.75** |
| HCl | — | 0.40 | 0.57 | 0.00 | — | 0.40 | 0.57 | — |

TABLE A-continued

Experimental Diets for Zeolite Study (Weight Percent)

| Ingredient | Diet No. 1 | 2 | 3 | 4 | 5 | 6 | 7 | 8 |
|---|---|---|---|---|---|---|---|---|
| | | 4.00.% calcium | | | | 2.75% calcium | | |
| | 0.0 | 0.75 | 1.50 | .68 (special) | 0.0 | 0.75 | 1.50 | 0.75 |
| | 100.0 | 100.0 | 100.0 | 100.0 | 100.0 | 100.0 | 100.0 | 100.0 |

*0.68 is the special zeolite. (Diet 4)
**0.75 and 1.50 is zeolite A.

Tests criteria were as follows:
1. Egg production (weekly)
2. Feed consumption (weekly)
3. Egg specific gravity (weekly)
4. Egg weight (weekly)
5. Shell weight (middle and end of experiment)
6. Serum calcium at termination
7. Body weight at initiation and termination
8. Mortality All eggs laid during a 3-day period each week of the experiment and the first week prior to the experiment were used for specific gravity and egg weight measurements.

The results are summarized in Tables B, C, D, E, F and G as follows:

TABLE D

SHELL WEIGHT (Grams/Egg)

| Diet | No. of Eggs | Week 4 | Week 8 | Avg. for 8 Weeks |
|---|---|---|---|---|
| 1–4 | 240 | 5.32 | 5.23 | 5.28 |
| 5–8 | 240 | 5.12 | 5.08 | 5.10 |
| 1 and 5 | 120 | 5.06 | 5.06 | 5.06 |
| 2 and 6 | 120 | 5.22 | 5.14 | 5.18 |
| 3 and 7 | 120 | 5.31 | 5.23 | 5.27 |
| 4 and 8 | 120 | 5.29 | 5.19 | 5.24 |
| 1 | 60 | 5.23 | 5.20 | 5.22 |
| 2 | 60 | 5.37 | 5.27 | 5.32 |
| 3 | 60 | 5.40 | 5.29 | 5.35 |
| 4 | 60 | 5.29 | 5.18 | 5.24 |
| 5 | 60 | 4.89 | 4.93 | 4.91 |
| 6 | 60 | 5.08 | 5.00 | 5.04 |
| 7 | 60 | 5.21 | 5.17 | 5.19 |
| 8 | 60 | 5.29 | 5.21 | 5.25 |

TABLE B

EGG SPECIFIC GRAVITY*

| Diet | No. of Eggs | Week 0 | Week 1 | Week 2 | Week 3 | Week 4 | Week 5 | Week 6 | Week 7 | Week 8 | Avg. for 8 Weeks |
|---|---|---|---|---|---|---|---|---|---|---|---|
| 1–4 | 240 | 80.24 | 80.33 | 80.70 | 81.03 | 80.90 | 80.52 | 78.21 | 80.76 | 80.69 | 80.39 |
| 5–8 | 240 | 80.04 | 78.69 | 78.32 | 79.15 | 78.57 | 77.75 | 76.48 | 78.99 | 78.80 | 78.34 |
| 1 and 5 | 120 | 79.88 | 78.37 | 77.63 | 78.16 | 77.96 | 77.14 | 75.42 | 77.90 | 77.74 | 77.54 |
| 2 and 6 | 120 | 79.64 | 79.13 | 79.47 | 79.93 | 79.83 | 79.43 | 77.20 | 80.10 | 79.51 | 79.33 |
| 3 and 7 | 120 | 80.56 | 80.60 | 81.14 | 81.59 | 80.84 | 79.87 | 78.85 | 80.67 | 81.15 | 80.59 |
| 4 and 8 | 120 | 80.47 | 79.93 | 79.79 | 80.67 | 80.33 | 80.08 | 77.91 | 80.83 | 80.58 | 80.01 |
| 1 | 60 | 80.27 | 80.12 | 79.42 | 80.30 | 79.86 | 79.49 | 77.59 | 79.53 | 79.19 | 79.44 |
| 2 | 60 | 79.70 | 79.03 | 80.53 | 81.17 | 81.27 | 80.67 | 78.86 | 81.01 | 81.29 | 80.48 |
| 3 | 60 | 80.35 | 81.84 | 81.96 | 81.92 | 81.66 | 81.53 | 79.16 | 81.33 | 81.91 | 81.44 |
| 4 | 60 | 80.64 | 80.33 | 80.88 | 80.73 | 80.82 | 80.38 | 77.22 | 81.18 | 80.38 | 80.24 |
| 5 | 60 | 79.50 | 76.63 | 75.83 | 76.03 | 76.06 | 74.80 | 73.25 | 76.28 | 76.30 | 75.65 |
| 6 | 60 | 79.60 | 79.24 | 78.41 | 78.70 | 78.39 | 78.20 | 75.55 | 79.19 | 77.73 | 78.17 |
| 7 | 60 | 80.77 | 79.35 | 80.32 | 81.26 | 80.01 | 78.21 | 78.54 | 80.01 | 80.40 | 79.76 |
| 8 | 60 | 80.31 | 79.54 | 78.70 | 80.61 | 79.83 | 79.79 | 78.60 | 80.47 | 80.77 | 79.79 |

*Divide by 1000 and add 1 to convert to Actual Specific Gravity.

TABLE C

EGG PRODUCTION (Percent Hen Per day)

| Diet | No. of Percent Calculations | Week 0 | Week 1 | Week 2 | Week 3 | Week 4 | Week 5 | Week 6 | Week 7 | Week 8 | Avg. for 8 Weeks |
|---|---|---|---|---|---|---|---|---|---|---|---|
| 1–4 | 240 | 89.88 | 86.44 | 88.59 | 85.10 | 87.97 | 87.87 | 87.54 | 86.53 | 84.46 | 86.81 |
| 5–8 | 240 | 90.21 | 86.59 | 84.17 | 81.99 | 84.65 | 83.45 | 82.84 | 82.58 | 81.82 | 83.51 |
| 1 and 5 | 120 | 90.42 | 89.25 | 88.50 | 85.82 | 87.86 | 87.74 | 85.48 | 84.82 | 85.25 | 86.84 |
| 2 and 6 | 120 | 90.08 | 84.55 | 86.43 | 84.96 | 87.13 | 86.46 | 86.69 | 84.67 | 82.71 | 85.45 |
| 3 and 7 | 120 | 89.58 | 85.12 | 85.46 | 81.98 | 86.32 | 83.93 | 85.02 | 85.65 | 84.22 | 84.71 |
| 4 and 8 | 120 | 90.08 | 87.14 | 85.12 | 81.42 | 83.93 | 84.52 | 83.57 | 83.09 | 80.36 | 83.65 |
| 1 | 60 | 90.00 | 90.00 | 90.07 | 86.19 | 90.00 | 88.33 | 86.67 | 84.76 | 87.38 | 87.93 |
| 2 | 60 | 90.00 | 83.62 | 85.95 | 85.39 | 87.84 | 88.86 | 89.10 | 88.15 | 82.09 | 86.38 |
| 3 | 60 | 89.67 | 84.76 | 88.81 | 84.52 | 86.90 | 87.38 | 86.77 | 88.46 | 85.27 | 86.61 |
| 4 | 60 | 89.63 | 87.38 | 89.52 | 84.28 | 87.14 | 86.90 | 87.62 | 84.76 | 83.10 | 86.34 |
| 5 | 60 | 90.83 | 88.49 | 86.91 | 85.45 | 85.71 | 87.14 | 84.29 | 84.87 | 83.12 | 85.75 |
| 6 | 60 | 90.17 | 85.48 | 86.91 | 84.52 | 86.43 | 84.04 | 84.29 | 81.19 | 83.33 | 84.52 |
| 7 | 60 | 89.50 | 85.48 | 82.12 | 79.44 | 85.74 | 80.48 | 83.28 | 82.83 | 83.17 | 82.82 |
| 8 | 60 | 90.33 | 86.91 | 80.72 | 78.57 | 80.72 | 82.14 | 79.52 | 81.43 | 77.62 | 80.95 |

TABLE E

FEED CONSUMPTION (Grams Per Hen Per Day)

| Diet | No. of Weighings | Week 1 | Week 2 | Week 3 | Week 4 | Week 5 | Week 6 | Week 7 | Week 8 | Avg. for 8 Weeks |
|---|---|---|---|---|---|---|---|---|---|---|
| 1-4 | 240 | 105.48 | 108.16 | 109.76 | 110.13 | 112.85 | 105.64 | 110.57 | 115.53 | 109.76 |
| 5-8 | 240 | 103.91 | 101.62 | 106.01 | 96.66 | 107.96 | 103.42 | 107.12 | 112.09 | 104.85 |
| 1 and 5 | 120 | 112.06 | 105.92 | 109.32 | 107.44 | 112.54 | 106.08 | 110.57 | 116.80 | 110.09 |
| 2 and 6 | 120 | 101.85 | 104.96 | 107.04 | 105.92 | 109.13 | 102.66 | 108.82 | 113.69 | 106.76 |
| 3 and 7 | 120 | 102.08 | 105.07 | 107.99 | 101.47 | 110.17 | 105.25 | 109.16 | 112.40 | 106.70 |
| 4 and 8 | 120 | 102.78 | 103.60 | 107.20 | 98.76 | 109.76 | 104.12 | 106.84 | 112.35 | 105.67 |
| 1 | 60 | 113.25 | 109.55 | 112.98 | 115.07 | 117.42 | 106.76 | 113.94 | 119.90 | 113.61 |
| 2 | 60 | 99.45 | 106.05 | 107.28 | 110.78 | 111.20 | 102.75 | 109.22 | 113.21 | 107.49 |
| 3 | 60 | 104.65 | 109.60 | 111.13 | 108.85 | 111.98 | 107.66 | 110.73 | 115.78 | 110.05 |
| 4 | 60 | 104.56 | 107.43 | 107.65 | 105.82 | 110.78 | 105.38 | 108.40 | 113.21 | 107.90 |
| 5 | 60 | 110.86 | 102.30 | 105.65 | 99.81 | 107.65 | 105.41 | 107.21 | 113.69 | 106.57 |
| 6 | 60 | 104.24 | 103.88 | 106.80 | 101.05 | 107.07 | 102.57 | 108.42 | 114.16 | 106.02 |
| 7 | 60 | 99.52 | 100.53 | 104.85 | 94.08 | 108.37 | 102.83 | 107.59 | 109.03 | 103.35 |
| 8 | 60 | 101.01 | 99.77 | 106.75 | 91.70 | 108.74 | 103.87 | 105.28 | 111.48 | 103.45 |

TABLE F

BODY WEIGHT (Grams per Hen)

| Diet | No. of Weighings | Week 0 | Week 1 |
|---|---|---|---|
| 1-4 | 240 | 1,538.58 | 1,550.63 |
| 5-8 | 240 | 1,518.58 | 1,520.00 |
| 1 and 5 | 120 | 1,526.25 | 1,565.00 |
| 2 and 6 | 120 | 1,528.00 | 1,542.00 |
| 3 and 7 | 120 | 1,515.58 | 1,492.00 |
| 4 and 8 | 120 | 1,544.50 | 1,542.25 |
| 1 | 60 | 1,541.67 | 1,579.33 |
| 2 | 60 | 1,525.83 | 1,543.17 |
| 3 | 60 | 1,518.67 | 1,507.00 |
| 4 | 60 | 1,508.17 | 1,573.00 |
| 5 | 60 | 1,510.83 | 1,550.67 |
| 6 | 60 | 1,530.17 | 1,540.83 |
| 7 | 60 | 1,512.50 | 1,477.00 |
| 8 | 60 | 1,520.83 | 1,511.50 |

In Table D there appears to be an indication of some benefits from zeolite A.

Previous indications that feed consumption was reduced without any reduction in egg or body weight or in egg production could not be substantiated by the statistical data. As shown in Table E 1.5% zeolite A reduced feed consumption, relative to baseline, at both Ca levels in Weeks 1 and 4. However, this did not occur in the other six weeks of the trial. Thus, if we look at the results for the 8th week:

| % Ca | Run No. | Feed Cons. (g/hen/day) |
|---|---|---|
| 2.75 | 1 | 113.69 |
| 2.75 | 2 | 114.16 |
| 2.75 | 3 | 109.03 |
| 2.75 | 4 | 111.48 |

TABLE G

EGG WEIGHTS (Grams per Egg)

| Diet | No. of Weighings | Week 0 | Week 1 | Week 2 | Week 3 | Week 4 | Week 5 | Week 6 | Week 7 | Week 8 | Avg. for 8 Weeks |
|---|---|---|---|---|---|---|---|---|---|---|---|
| 1-4 | 240 | 59.04 | 59.87 | 59.98 | 60.06 | 59.95 | 59.95 | 59.88 | 60.19 | 60.19 | 60.05 |
| 5-8 | 240 | 58.85 | 59.38 | 59.45 | 59.59 | 59.84 | 59.81 | 59.51 | 59.60 | 59.97 | 59.64 |
| 1 and 5 | 120 | 58.58 | 59.12 | 59.49 | 59.53 | 59.64 | 59.77 | 59.59 | 60.14 | 60.22 | 59.69 |
| 2 and 6 | 120 | 58.93 | 59.96 | 59.91 | 59.84 | 60.13 | 59.88 | 59.64 | 59.97 | 60.09 | 59.93 |
| 3 and 7 | 120 | 58.95 | 59.72 | 59.80 | 59.86 | 60.26 | 59.77 | 59.81 | 59.72 | 60.01 | 59.87 |
| 4 and 8 | 120 | 59.31 | 59.69 | 59.67 | 60.06 | 60.31 | 60.08 | 59.73 | 59.76 | 59.99 | 59.91 |
| 1 | 60 | 58.74 | 59.66 | 60.03 | 60.03 | 60.33 | 59.81 | 60.13 | 60.70 | 60.77 | 60.18 |
| 2 | 60 | 59.21 | 60.28 | 59.98 | 60.05 | 60.37 | 60.56 | 59.93 | 60.39 | 60.23 | 60.22 |
| 3 | 60 | 58.94 | 59.62 | 60.26 | 60.00 | 60.57 | 59.56 | 59.92 | 59.88 | 60.13 | 59.99 |
| 4 | 60 | 59.26 | 59.92 | 59.66 | 60.17 | 60.05 | 59.85 | 59.54 | 59.78 | 59.61 | 59.82 |
| 5 | 60 | 58.42 | 58.59 | 58.95 | 59.03 | 58.95 | 59.73 | 59.04 | 59.58 | 59.66 | 59.19 |
| 6 | 60 | 58.66 | 59.64 | 59.84 | 59.64 | 59.90 | 59.20 | 59.34 | 59.54 | 59.96 | 59.63 |
| 7 | 60 | 58.96 | 59.63 | 59.34 | 59.72 | 59.95 | 59.97 | 59.71 | 59.56 | 59.89 | 59.75 |
| 8 | 60 | 59.35 | 59.46 | 59.70 | 59.96 | 60.56 | 60.32 | 59.93 | 59.75 | 60.36 | 60.01 |

A review of the test data in Table B shows that zeolite A provided a definite benefit on shell quality, and had no significant effect on the other qualities studied except possibly for shell weight. Two concentrations (0.75%, 1.5%) were evaluated because of sodium limitations and for those levels, the data showed a linear relationship with concentration.

In Table C zeolite A had no significant effect on production (percent hen per day). However, there is some indication that a slight reduction occurred, particularly with Diet 8 in the 2.75% Ca series (i.e. low-calcium).

The reduced value is most likely attributable to a palatability consideration. Laying hens usually eat more than they need. Any factor, such as feed dustiness, can reduce intake by up to 5% without an adverse effect.

Tables F and G show no significant benefits for body and egg weights.

From the egg production data and feed consumption data of Tables "C" and "E", respectively, and using the diet which is a normal, adequate laying hen diet, there is a positve correlation (95% Confidence Level) between improved feed efficiency and zeolite A in the diet. This is readily seen in Table "H", hereinafter.

TABLE H

FEED CONVERSION - EFFICIENCY OF FEED UTILIZATION
(Grams of Feed Consumed Per Egg Produced*)

| Diet No. | Week 1 | Week 2 | Week 3 | Week 4 | Week 5 | Week 6 | Week 7 | Week 8 | Avg. 8 Weeks |
|---|---|---|---|---|---|---|---|---|---|
| 1 | 125.83 | 121.63 | 131.08 | 127.85 | 132.93 | 123.18 | 134.43 | 137.22 | 129.27 |
| 2 | 118.93 | 123.39 | 125.64 | 126.07 | 125.14 | 115.32 | 123.90 | 137.91 | 124.54 |
| 3 | 123.47 | 123.41 | 131.48 | 125.26 | 128.15 | 124.08 | 125.18 | 135.78 | 127.10 |

*Each determination was calculated from the average feed weighings representing 60 eggs produced.

An increase in egg weight is readily apparent with the calcium deficient diet. The applicable portion of Table G is set forth hereinafter as Table "I".

TABLE I

EGG WEIGHT (GRAMS PER EGG)

| Diet No. | Week 1 | Week 2 | Week 3 | Week 4 | Week 5 | Week 6 | Week 7 | Week 8 | Avg. 8 Weeks | Standard Deviation |
|---|---|---|---|---|---|---|---|---|---|---|
| 5 | 58.59 | 58.95 | 59.03 | 58.95 | 59.73 | 59.04 | 59.58 | 59.66 | 59.19 | .4119 |
| 6 | 59.64 | 59.84 | 59.64 | 59.90 | 59.20 | 59.34 | 59.54 | 59.96 | 59.63 | .2681 |
| 7 | 59.83 | 59.34 | 59.72 | 59.95 | 59.97 | 59.71 | 59.56 | 59.89 | 59.75 | .2141 |

In a preliminary study of a relatively few laying hens with one percent zeolite in the diet it was indicated that the relative ranks of zeolites in improving shell strength were as follows:

| Rank | Shell Strength |
|---|---|
| 1 | Zeolite A |
| 2 | Synthetic Mordenites |
| 3 | Synthetic Zeolite X |
| 4 | Natural Erionite |
| 5 | Natural Clinoptilolite |
| 6 | Synthetic Zeolite Y |

In shell strength, the controls were inferior to or equal to the poorest of all the zeolites.

The later studies clearly show that zeolite A is effective in increasing shell strength. Some increase in shell strength using mordenite should also be expected.

The term poultry includes all domestic fowl, namely chickens, turkeys, ducks, geese, and the like.

Corn is the principal diet for most laying poultry. A feed formulation comprising by weight percent the following is desirable:

| | Weight Percent |
|---|---|
| corn | 50–75 |
| soybean meal | 10–30 |
| calcium carbonate | 4–10 |
| zeolite A | 0.25–4.0 |

Calcium carbonate is usually in the form of natural limestone ground to a suitable particle size, but sometimes oyster shells which have also been suitably ground are used.

It can be appreciated that a wide variety of nutrients or foods may be included in the diets of poultry or poultry laying hens. In a controlled environment, the poultry are only exposed to desired foods or food products. A typical ration for laying poultry contains the following:

| | | Weight Percent |
|---|---|---|
| crude protein | not less than | 16.0 |
| crude fat | not less than | 2.5 |
| crude fiber | not more than | 7.0 |
| calcium as (Ca) | not less than | 3.1 |
| calcium (as Ca) | not more than | 4.1 |
| phosphorus (P) | not less than | 0.5 |
| iodine (I) | not less than | 0.0001 |
| salt (NaCl) | not less than | 0.3 |
| salt (NaCl) | not more than | 0.9 |

The foregoing composition is obtained from or included the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products. Includes soybean oil meal, barley malt sprouts, coconut meal, corn distillers grain, corn gluten meal, cottonseed meal, pea seed, potato meal, peanut meal, rape seed meal, sunflower meal, wheat germ meal, brewers' yeast. All of these are protein sources.

Roughage or fiber. Includes dehydrated alfalfa, alfalfa hay, alfalfa leaf meal and pasture grasses. These are all fiber sources.

Animal and fish by-products. Includes blood meal, blood flour, dried buttermilk, dried whey, dried casein, fish meal, dried fish solubles, liver meal, meat meal, meat meal tankage, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL methionine, choline chloride, folic acid, dicalcium phosphate, magnesium sulfonate, potassium sulfate, calcium carbonate (limestone, oyster shells), salt, sodium selenite, manganous oxide, calcium iodate, copper oxide, zinc oxide and D activated animal sterol.

Molasses and animal fats are added to improve palatability and to increase or balance the energy levels.

Preservatives are also added such as, Ethoxyquin TM and sodium sulfite.

In general, a feed composition for poultry laying hens should preferably contain by weight percent the following:

|  |  | Weight Percent |
| --- | --- | --- |
| crude protein | at least about | 14 |
| crude fat | at least about | 2 |
| crude fiber | not more than about | 7 |
| calcium | about | 2.7 to 4.1 |
| phosphorous | at least about | 0.05 |
| iodine | at least | 0.0001 |
| sodium | about | 0.1 to 0.4 |
| chlorine | about | 0.1 to 0.5 |
| zeolite A | about | 0.25 to 4.0 |

The foregoing disclosure and description of the invention is illustrative and explanatory thereof and various changes in the illustrated process may be made within the scope of the appended claims without departing from the spirit of the invention.

What is claimed is:

1. A method of improving the feed efficiency utilization of poultry wherein an effective amount of zeolite A sufficient to improve the feed efficiency utilization of the poultry up to about 4 weight percent of the feed is added to the feed of the poultry and the feed is fed to the poultry.

2. The method of claim 1, wherein the amount of zeolite A added to the feed is from about 0.25 percent to 3.5 weight.

3. The method of claim 1, wherein said zeolite A in said feed is in an amount of about 0.75 to about 1.5 weight percent.

4. The method of claim 1, wherein the amount of zeolite A added to the feed is about 0.75 weight percent.

5. The method of claim 1, wherein the amount of zeolite A added to the feed is about 1.5 weight percent.

6. The method of claim 1, wherein the feed formulation contains zeolite A in an amount of about 0.75 to about 3.5 weight percent.

7. The method of claim 1, wherein the feed comprises proteins, carbohydrates, minerals and vitamins.

8. The method of claim 1, wherein the feed comprises by weight percent the following:

| crude protein | at least 14 |
| --- | --- |
| crude fat | at least 2 |
| crude fiber | not more than 7.0 |
| calcium | about 2.7 to 4.1 |
| phosphorus | at least 0.4 |
| iodine | at least 0.0001 |
| sodium | about 0.1 to 0.4 |
| chloride | about 0.1 to 0.5 |
| zeolite A | about 0.25 to 4.0 |

9. The method of claim 1, wherein the feed comprises by weight percent the following:

| crude protein | at least 16 |
| --- | --- |
| crude fat | at least 2.5 |
| crude fiber | not more than 7.0 |
| calcium | about 3.1 to 4.1 |
| phosphorus | at least 0.5 |
| iodine | at least 0.0001 |
| sodium | about 0.1 to 0.3 |
| chloride | about 0.1 to 0.3 |
| zeolite A | about 0.25 to 4.0 |

10. The method of claim 1, wherein the poultry are chickens.

11. The method of claim 1, wherein the poultry are laying hens.

12. The method of claim 1, wherein the poultry are laying hens and the average weight of the eggs produced by the laying hens is increased over that of similar laying hens fed a similar feed not containing zeolite A.

13. A method of improving the feed efficiency utilization of poultry wherein a feed formulation comprising principally corn, and about 0.25 to about 4.00 percent by weight of zeolite A is fed to the laying poultry.

14. The method of claim 13, wherein the feed formulation contains zeolite A in an amount of about 0.75 to about 3.5 weight percent.

15. The method of claim 13, wherein the feed formulation contains zeolite A in an amount of about 0.75 to about 1.5 weight percent.

16. The method of claim 13, wherein the poultry are laying chickens.

17. A method of improving the feed efficiency utilization of poultry, wherein a feed formulation comprising by weight percent, 50–75 percent corn, 10–30 percent soybean meal and 4–10 percent calcium carbonate, and about 0.25 percent to about 4.0 percent by weight of zeolite A is fed to the laying poultry.

18. The method of claim 17, wherein the feed formulation contains zeolite A in an amount of about 0.75 to about 3.5 weight percent.

19. The method of claim 17, wherein the feed formulation contains zeolite A in an amount of about 0.75 to about 1.5 weight percent.

20. The method of claim 17, wherein the poultry are laying chickens.

* * * * *

UNITED STATES PATENT AND TRADEMARK OFFICE
CERTIFICATE OF CORRECTION

PATENT NO. : 4,610,882
DATED : September 9, 1986
INVENTOR(S) : Sebastian M. Laurent et al It is certified that error appears in the above-identified patent and that said Letters Patent is hereby corrected as shown below:

Column 2, line 23, "aluminosiicates" should read -- aluminosilicates --;

Column 2, line 26, "ony" should read -- only --;

Column 2, line 32, "O (Al + Si) = 2 " should read -- O/(Al + Si) = 2 --;

Column 2, line 50, "$Na_2O \cdot Al_2O_3 xSiO_2 \cdot yH_2O$" should read -- $Na_2O \cdot Al_2O_3 \cdot xSiO_2 \cdot yH_2O$;

Column 2, line 60, "1.85 + 0.5" should read -- 1.85 $\pm$ 0.5 --;

Column 4, line 38, "sight" should read -- slight --;

Column 7, Table C, Diet 4, Week 0, "89.63" should read -- 89.83 --;

Column 9, Table G, Diet 7, Week 1, "59.63" should read -- 59.83 --.

Signed and Sealed this

Sixteenth Day of December, 1986

*Attest:*

DONALD J. QUIGG

*Attesting Officer*  *Commissioner of Patents and Trademarks*